United States Patent [19]

Kato

[11] Patent Number: 5,215,350

[45] Date of Patent: Jun. 1, 1993

[54] LUMBAR SUPPORT DEVICE

[75] Inventor: Sakae Kato, Akishima, Japan

[73] Assignee: Tachi-S Co., Ltd., Akishima, Japan

[21] Appl. No.: 672,352

[22] Filed: Mar. 20, 1991

[51] Int. Cl.⁵ ............................................... A47C 3/00
[52] U.S. Cl. ............................... 297/284.4; 297/284.1
[58] Field of Search ........... 297/284 A, 284 R, 284 C, 297/284 FF

[56] References Cited

U.S. PATENT DOCUMENTS

| | | | |
|---|---|---|---|
| 4,162,807 | 7/1979 | Yoshimura | 297/284 C |
| 4,534,592 | 8/1985 | Hattori | 297/284 C |
| 4,671,569 | 6/1987 | Kazaoka et al. | 297/284 C |
| 4,678,230 | 7/1987 | Winkle | 297/284 C |
| 5,011,223 | 4/1991 | Kato | 297/284 C |

FOREIGN PATENT DOCUMENTS

| | | | |
|---|---|---|---|
| 2562003 | 10/1985 | France | 297/284 H |
| 2-9155 | 1/1990 | Japan. | |
| 2-13436 | 1/1990 | Japan. | |

Primary Examiner—Kenneth J. Dorner
Assistant Examiner—Milton Nelson, Jr.
Attorney, Agent, or Firm—Oldham, Oldham & Wilson Co.

[57] ABSTRACT

A lumbar support device for an automotive seat, in which a support arm, on which a lumbar support plate is rockably supported, is retained in a base bracket against movement by way of a biasing member and limiting element, under an unloaded condition. Therefore, the lumbar support plate does not give a pressure to the lumbar part of an occupant on the seat.

7 Claims, 4 Drawing Sheets

LUMBAR SUPPORT DEVICE

BACKGROUND OF THE INVENTION

1. Field of the Invention

The present invention relates to a lumbar support device for use in an automotive seat.

2. Description of Prior Art

Among various conventional lumbar support devices provided in an automotive seat, there has been known the one of the type wherein a lumbar support plate is rockably supported on a free end of a support arm whose base end is pivoted to a base bracket in a rotatable way, so as to adjustably support the lumbar part of an occupant sitting on the seat. In most instances, such device includes a spring biasing member provided between a cam and the base end of a support arm, the cam being operatively connected with an operation lever exposed on the lateral wall of the seat back of the seat, so that the lumbar support plate is resiliently biased toward the occupants' lumbar part by the biasing force of the spring member.

The lumbar support plate is so arranged within the seat back that the plate is disposed at a location corresponding to the occupants' lumbar part and closer to the occupant than other elastic support members as sinuous springs which elastically supports the cushion member of the seat back.

Thus, in such construction, the lumbar support plate is displaced forwardly and backwardly relative to the seat back, by operating the lever to change discrete cam surfaces of the cam to vary the biasing force of the spring biasing member. This adjustment is made, depending on the degree of the load being exerted upon the lumbar support plate from the occupant.

However, a defective aspect is found in this kind of conventional device, in that the forward projection of the lumbar support plate, more than the sinuous springs, results in increasing the thickness of the seat back on the whole, and creating variations in the outer configuration of the seat back as well as the cushioned surfaces thereof. Consequently, it has been difficult to produce a number of seats having the same configurations in a uniform way. Further, such irregularities in seat back configurations, makes a difference over all seat backs produced, whether they are the one containing the lumber support device or the one without it, having unfavorable results in terms of sitting touch and psychological state of occupant sitting on the seat.

In addition, in this device, the forward and backward displacement (stroke) of the lumbar support plate, which is made according to changes in the discrete surfaces of the cam, naturally varies the position of the plate per se against the occupant, with the result that the occupant feels excessively pressed or does not feel sufficient support touch at the lumbar part.

SUMMARY OF THE INVENTION

In view of the above-stated drawbacks, it is a purpose of the present invention to provide an improved lumbar support device which retains aesthetically good appearance of the seat back and eliminates an uneasy touch at the back of an occupant on a seat provided with the device.

For such purpose, according to the present invention, a lumbar support device is described including a base bracket, a support arm pivotally connected to the base bracket, a lumbar support plate secured on a free end of the support arm, a drive shaft supported by the base bracket rotatably, a cam having plural discrete cam levels, an operation lever, and a biasing means provided between the support arm and cam, the biasing means being adapted to bias the support arm, wherein the cam is rotated by operating the lever to change the cam levels so as to adjust a lumbar support force. There is provided a limiting means in the base bracket, by which the support arm is limited in its movement in a direction to support a person's lumbar part under a condition that no load is applied to the lumbar support plate, so as to permit for adjusting the biasing force of the biasing means to impart a desired supporting force to the lumbar support plate without displacement of the lumbar support plate toward the person side.

Accordingly, since the lumbar support plate is limited in its displacement towards the user's side, there is eliminated any uneasy seating touch at the seat back, and the user can usually sit on the seat as if no lumbar support device is provided therein. Further, the lumbar support device can be equipped not only with a seat back designed for accommodating the device, but also with an ordinary seat back not so designed.

In one aspect of the invention, the limiting means may be projection, stopper pin and bolt which is provided at the base bracket. The construction is therefore far more simplified, contributing to the cost reduction and speed-up of assemblage.

DETAILED DESCRIPTION OF PREFERRED EMBODIMENTS OF THE INVENTION

Figure 1:
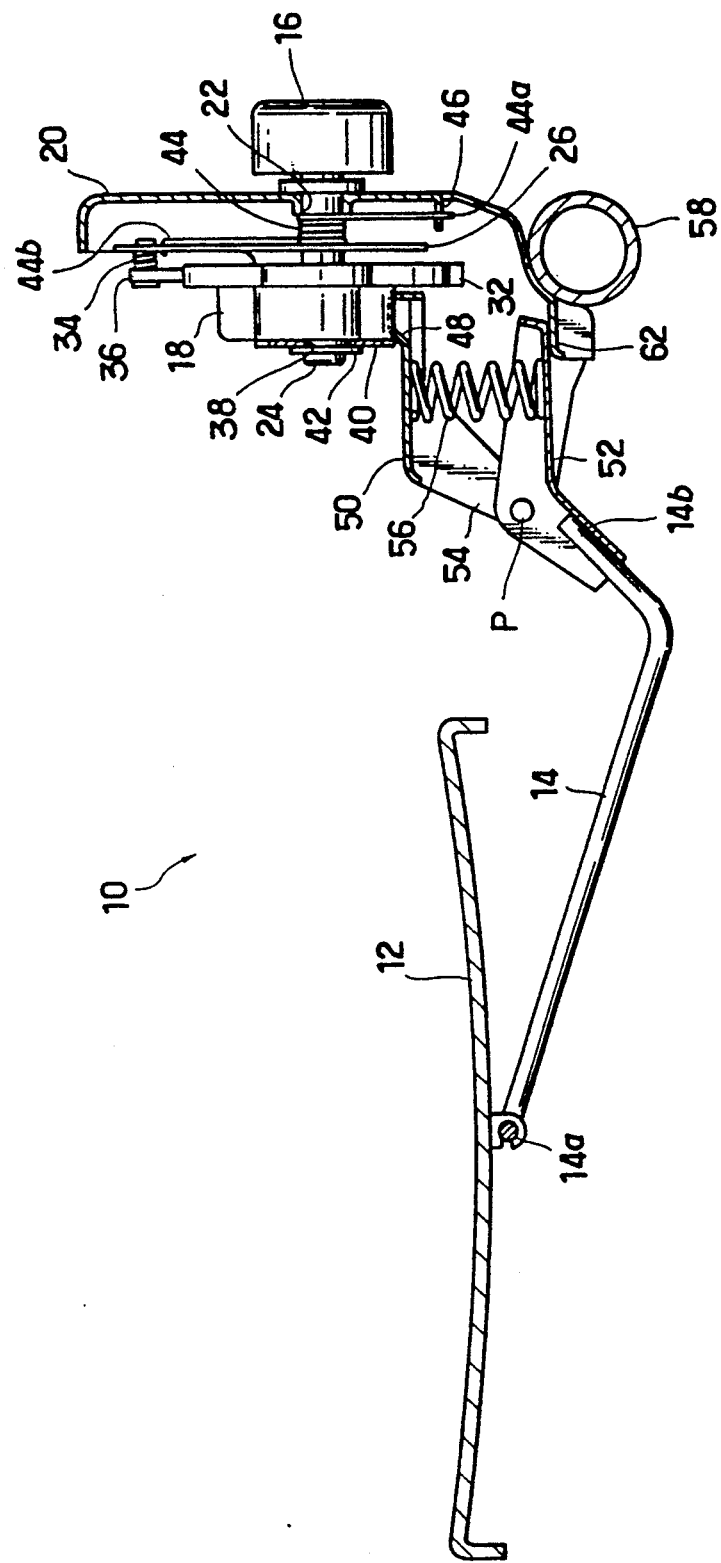
FIG. 1 is a longitudinally sectional view of a lumbar support device in accordance with the present invention.
Figure 2:
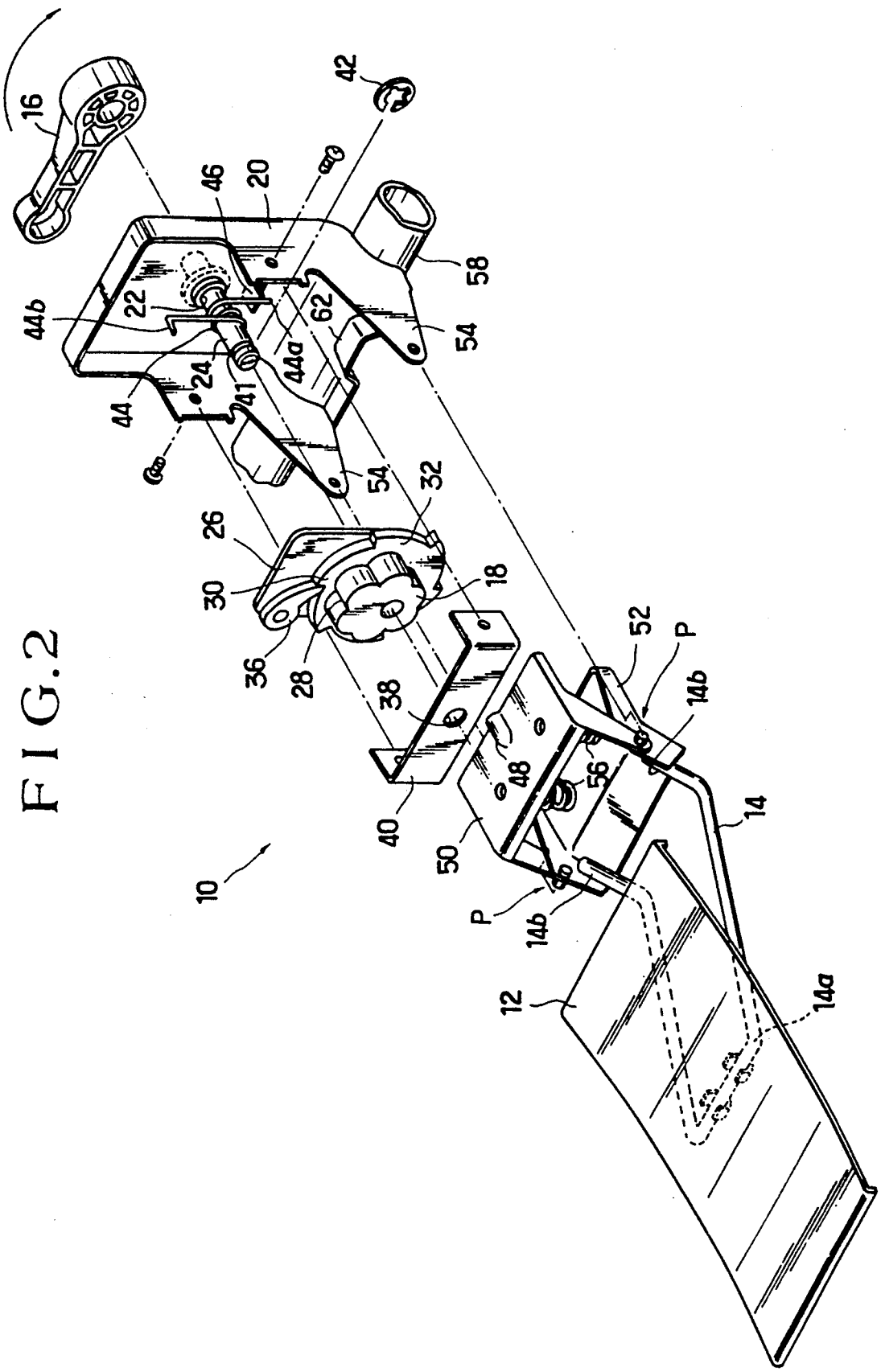
FIG. 2 is an exploded perspective view of the lumbar support device.

Referring to FIGS. 1 and 2, as generally designated at (10), a lumbar support device according to the present invention is illustrated, which basically comprises a lumbar support plate (12), a support arm (14), a cam (18), an operation lever (16) and base bracket (20).

The lumbar support plate (12) is supported on the free end of the support arm (14) in a manner to be rockable thereupon.

The base bracket (20) is formed in the shape of rectangular container opened at it one side, having a pair of spaced-apart lower projected parts (54) (54) formed integrally therewith, and through-hole (22) formed at the vertical wall of the bracket, the hole (22) being provided with a rim circumferentially thereof. A drive shaft (24) passes through the hole (22), such that the outward end of the shaft (24) projects outside of the base bracket (20) to be fixed to the operation lever (16) while the inward end part of the shaft (24) extends inwardly of the bracket (20). On that inward end part of the shaft (24), are mounted a return spring (44), a latch plate (26) and the cam (18) in this order.

The cam (18) is of an eccentric type having six engagement valley portions (28) formed peripherally thereof such that they are different in engagement level from one another with respect to an engagement projection (48) to be described later. The cam (18) is formed integrally with a ratchet (32) having six stopper teeth (30) each being arranged correspondingly to the respective six engagement valley portions (28) of the cam (18). The cam (18) is rotatable about the drive shaft (24).

The latch plate (26) is fixed on the drive shaft (24) integrally, so that rotation of the shaft (24) causes simultaneous rotation of the latch plate (26). On such latch plate (26) there is provided a pawl (36) to be engaged with one of the stopper teeth (30). As best seen from FIG. 1, the pawl (36) is biased into engagement with the stopper tooth (30) under the biasing force of the torsion spring (34).

A generally U-shaped support bracket (40) having a hole (38) formed at its center is secured to both sides of the base bracket (20) by means of screws in such manner that the inward end of the drive shaft (24) passes through the hole (38) of the support bracket (40). A E ring (42) is fitted to annular groove (41) formed at the end of the drive shaft, to thereby prevent the shaft (24) against falling off from the base bracket (20).

The return spring (44) is wound on the drive shaft (24), having two securing ends (44a) (44b), one of which (i.e. 44a) is firmly fitted to the latch plate (26) and the other of which (i.e. 44b) is secured to a lug (46) of the base bracket (20), such as to bias the operation lever (16) towards an initial home position under a biasing force acted in a direction to cause disengagement of the pawl (36) from the tooth (30) of ratchet (32).

If the operation lever (16) is rotated in the arrow direction as in FIG. 2, overcoming the biasing force of the torsion spring (44), the drive shaft (24) is thereby rotated to cause simultaneous rotation of the latch plate (26). Due to engagement between the pawl (36) and teeth (30), the cam (18) is caused to rotate together with the latch plate (26), whereupon one valley (28) of the cam (18) is changed to another valley (28) which is different in level from such first one. Then, releasing the lever (16) allows its rotation back to the initial position under the biasing force of the torsion spring (44), in which case, the cam (18) is not rotated because the pawl (36) is slidingly moved along the edge of teeth (30) as the latch plate (26) is rotated back together with the drive shaft (24) to its initial position.

A pressure plate (50) is pivotally connected with a support plate (52), with two compression springs (56) (56) secured therebetween. The assembled unit of those two plates (50) (52) is connected at its both pivot points (P) to the respective lower projected parts (54) (54) of the base bracket (20), while at the same time, the engagement projection (48) formed on top surface of the pressure plate (5) is engaged into one of the valley portions (28).

The base bracket (20) is formed at its lower edge with upwardly bent-formed extruded part (62) which limits the upward rotation of the support plate (52) about the pivot point (P), to thereby limit the clockwise rotation of the support arm (14) relative to the pivot point (P). This is a means for limiting the displacement of the lumbar support plate (12) in a direction to apply a pressure to the lumbar part of an occupant on the seat.

Both base ends (14b) (14b) of support arm (14) are fixed by soldering to one side of the support plate (42).

With the structure, a pressing force of the two compression springs (56) (56) is transmitted via the pressure plate (50) to the cam (18) and also imparted via the support arm (14) to the lumbar support plate (14).

As understandable from the figures, the foregoing component parts are assembled together in the base bracket (20) to provide a unit, making compact and small-sized the lumbar support device (10).

Figure 3:
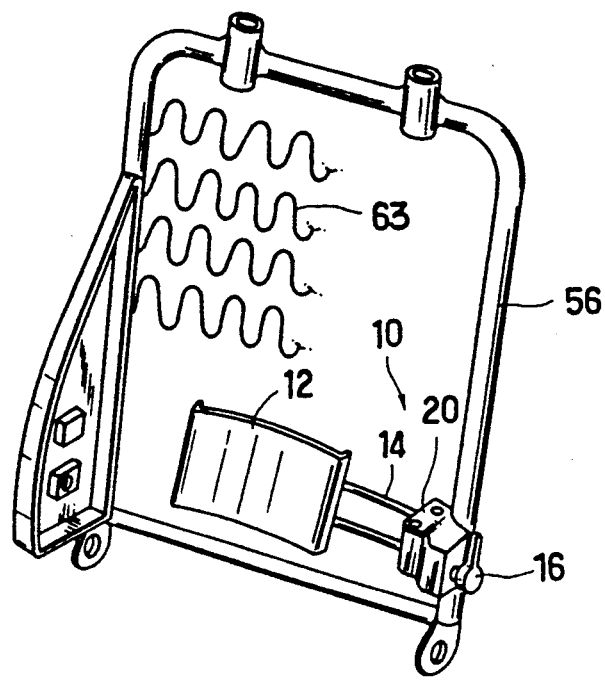
FIG. 3 is a schematic perspective view showing the state wherein the lumbar support device is mounted to a seat back frame.
Figure 4:
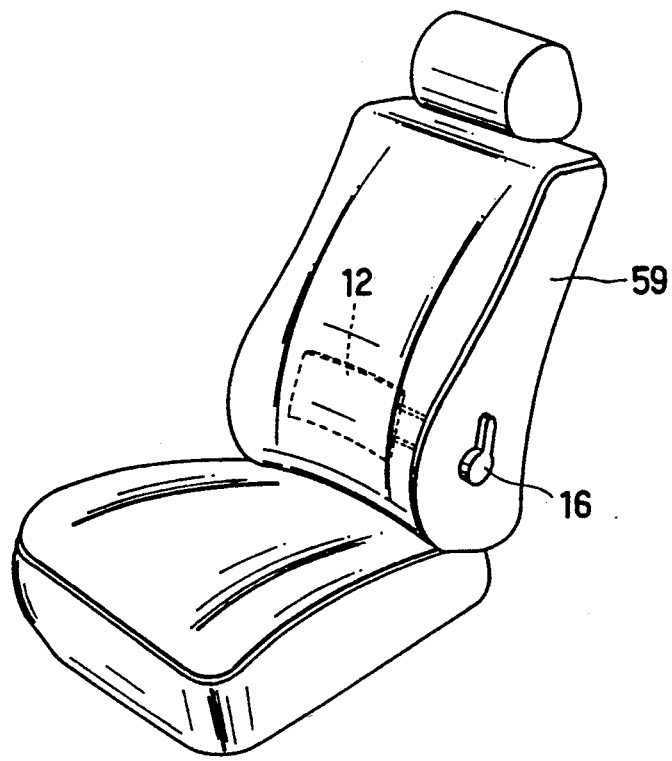
FIG. 4 is a perspective view showing the state wherein the lumbar support device is provided.

Then, as shown in FIGS. 3 and 4, the unit of device (10) is fixed to one lateral frame section of seat back frame (56), with its lumbar support plate (12) being disposed at a point facing towards the lumbar part of an occupant, and the operation lever (16) projecting laterally of the frame (56) to allow ready access thereto. The fixation is done by welding the bottom wall of the base bracket (20) to the frame (56).

Accordingly, when the operation lever (16) is rotated to cause simultaneous rotation of the cam (18), the engagement valleys (28) are changed from one to another, presenting different engagement level to the engagement projection (48) of the pressure plate (50), whereby the pressure plate (50) is moved accordingly upwards and downwards relative to the pivot point (P); in other words, varying its position away from or towards the support plate (52) according to respective high or low level of the engagement valleys (28) to be engaged with the engagement projection (48). Thus, the compression springs (56) between the pressure and support plates (50) (52) are subject to varied degrees of compressions, hence exerting different degrees of pressure forces upon the support plate (52). Here, it is important to note that the support plate (52) is retained against movement between the compression springs (56) and extruded part (62); namely, the expanding force of the springs (56) serves to bias the support plate (52) against upward movement, whereas the extruded part (62) formed in the base bracket (20) prevents the same plate (52) against downward movement. Accordingly, both support arm (14) and lumbar support plate (12) stand generally unmoved, under an unloaded condition; namely, the support arm (14) is retained against movement under the condition that any load is not applied thereto. Operation of the lever (16) provides for varying adjustably the resilient support force of the lumbar support plate (12).

It is therefore appreciated that a stroke of fore-and-aft movements of the lumbar support plate (12) is reduced or substantially eliminated, during adjustment of its support force against the lumbar part of occupant, which permits for locating the plate (12) more adjacent the inner wall of the seat back (59) and does not lead to such problems as irregularities in thickness of each seat back produced. Thus, an occupant on the seat will not feel uneasy at the back in the same way as if he or she sat in the seat having no lumbar support device, and the outer appearance of the seat back can be retained in its original, aesthetically better state.

Figure 5:
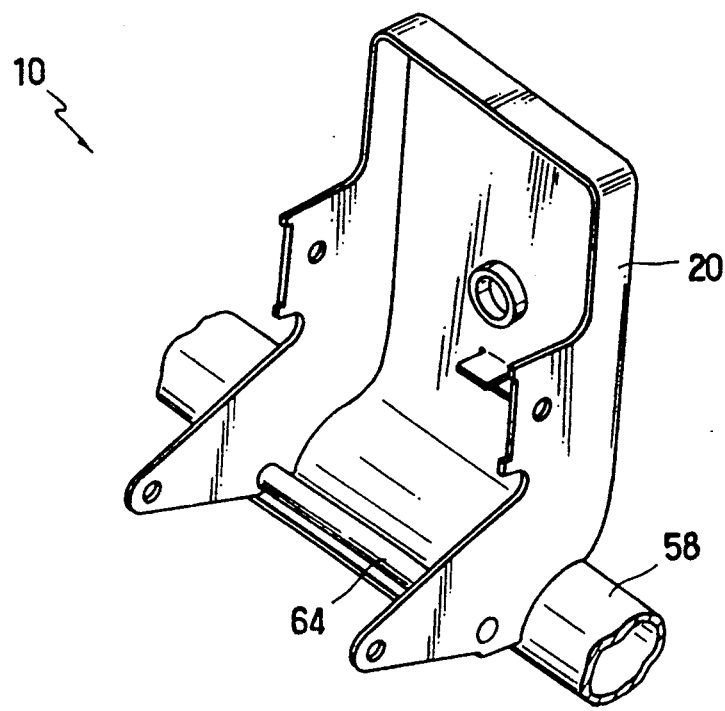
FIGS. 5 and 6 are schematic perspective views showing other embodiments of a base bracket in the lumbar support device.

FIG. 5 shows another embodiment of limiting means for limiting the movement of the support arm (14) in a direction to apply pressure to an occupant's lumbar part, instead of the extruded part (62). Namely, for that purpose, a stopper pin (64) is extended between both lateral sides of the base bracket (20) and fixed thereto.

Figure 6:
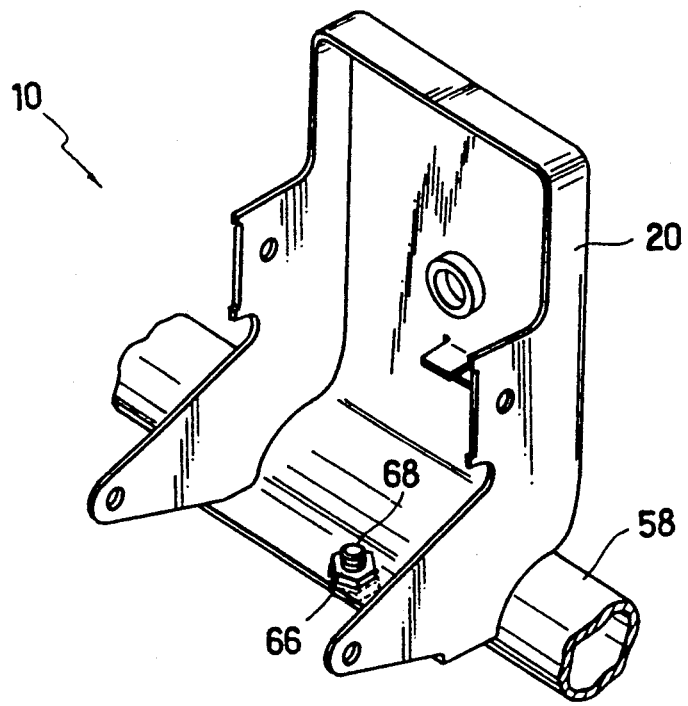

Further, FIG. 6 shows still another embodiment of the limiting means instead of the extruded part (62). That is, a screw (68) is penetrated through the bottom wall of the base bracket (20) from below to project its threaded body. The screw (68) is fixed thereto by means of a nut (66) being threadably engaged therewith.

It should be understood that the present invention is not limited to the illustrated embodiments but any other modifications, replacements and additions may structurally be possible without departing from the scope and spirit of the appended claims.

What is claimed is:

1. A lumbar support device comprising:
   a base bracket having a pivot point;
   a support arm pivotally having a base end portion pivotally connected to said pivot point of said base bracket;
   a lumbar support plate secured on a free end of said support arm;
   a drive shaft rotatably supported by said base bracket;
   a cam having plural discrete cam levels, said cam being connected with said drive shaft;
   an operation lever connected to said drive shaft;
   a pressure plate pivotally connected to said pivot point of said base bracket, said pressure plate being in contact with said cam;
   a biasing means provided between said base end portion of said support arm and said pressure plate, such that said support arm base end portion is urged by said biasing means to rotate about said pivot point in a direction towards a limiting means, while said pressure plate is also urged by said biasing means to rotate about said pivot in a direction to contact said cam, whereby said support arm is limited by said limiting means in its movement in a direction to support a person's lumbar portion of his anatomy, under a condition that no load is applied to said lumbar support plate; and
   a means for permitting adjustment of a biasing force of said biasing means in cooperation with said cam so as to impart a desired supporting force to said lumbar support plate, while preventing displacement of said lumbar support toward a person's lumbar portion of his anatomy.

2. The lumbar support device according to claim 1, wherein said cam is integrally provided with a ratchet having plural teeth, wherein a latch plate is fixed on said drive shaft, said latch plate further comprising a pawl which is rotatably provided for engagement with one of said teeth of said ratchet, and wherein a torsion spring is wound on said drive shaft and interposed between said latch plate and operation lever.

3. The lumbar support device according to claim 1, wherein said limiting means comprises an upwardly extruded part which is formed by pressing upwardly a part of a lower end of said base bracket.

4. The lumbar support device according to claim 1, wherein said limiting means comprises a stopper pin which is extended in said base bracket.

5. The lumbar support device according to claim 1, wherein said limiting means comprises a screw which is penetrated through a lower end part of said base bracket and fixed there to project inwardly of said base bracket.

6. The lumbar support device according to claim 1, wherein said means for permitting adjustment of said biasing force of said biasing means comprises a support plate which is pivotally connected to said pivot point of said base bracket, and wherein said base end portion of said support arm is fixed to said support plate, and wherein said biasing means is interposed between said support plate and said pressure plate.

7. The lumbar support device according to claim 6, wherein said cam is formed with plural engagement recesses, wherein said pressure plate is formed with an engagement projection to be engaged into one of said plural engagement recesses, and wherein said plural engagement recesses of said cam are different in engagement level from one another in relation to said engagement projection of said pressure plate.

* * * * *